United States Patent [19]

Jackson

[11] 4,162,555
[45] Jul. 31, 1979

[54] WIPER DRIVE ASSEMBLY

[75] Inventor: Theodore A. Jackson, Utica, Mich.

[73] Assignee: Cadillac Gage Company, Warren, Mich.

[21] Appl. No.: 924,466

[22] Filed: Jul. 14, 1978

[51] Int. Cl.² .................... B60S 1/46; B60S 1/20; B60S 1/44
[52] U.S. Cl. .................... 15/250.01; 15/250.24; 15/250.27
[58] Field of Search .......... 15/250.01–250.04, 15/250.16, 250.24–250.27, 250.29; 296/84 R, 1 R

[56] References Cited

U.S. PATENT DOCUMENTS

| | | | |
|---|---|---|---|
| 1,720,832 | 7/1929 | Gibson | 15/250.24 |
| 1,748,055 | 2/1930 | Brown et al. | 15/250.24 |
| 2,458,260 | 1/1949 | Gray | 15/250.24 X |
| 3,320,627 | 5/1967 | Engel | 15/250.29 |
| 3,609,794 | 10/1971 | Schallehn | 15/250.24 |

FOREIGN PATENT DOCUMENTS 1958735 6/1970 Fed. Rep. of Germany ........ 15/250.29

Primary Examiner—Peter Feldman

Attorney, Agent, or Firm—Reising, Ethington, Barnard, Perry & Brooks

[57] ABSTRACT

A wiper drive assembly (20) disclosed is particularly adaptable for use with angularly skewed vision blocks (22) of an armored car. A hollow guide (28) of the assembly includes elongated first and second guide portions (30,32) that are adapted to extend alongside the vision blocks and which receive respective first and second wiper supports (70,104). Each wiper support has an extension that projects through a slot in the associated guide portion so as to allow mounting of the arm of an associated wiper (24,26). One of the wiper supports has its extension provided with a slidable connection (86) to a continuous drive loop which is preferably in the form of a chain (34) received by a pair of sprocket type sheaves (36,38). Driving of one of the sheaves moves the chain so as to drive the first wiper support (70) in a reciprocal manner. An elongated connector of the drive assembly is preferably embodied by a wire (118) that extends between the first and second wiper supports within the guide portions in a guided relationship so as to move the second wiper support (104) along with the first wiper support in a reciprocal manner.

30 Claims, 11 Drawing Figures

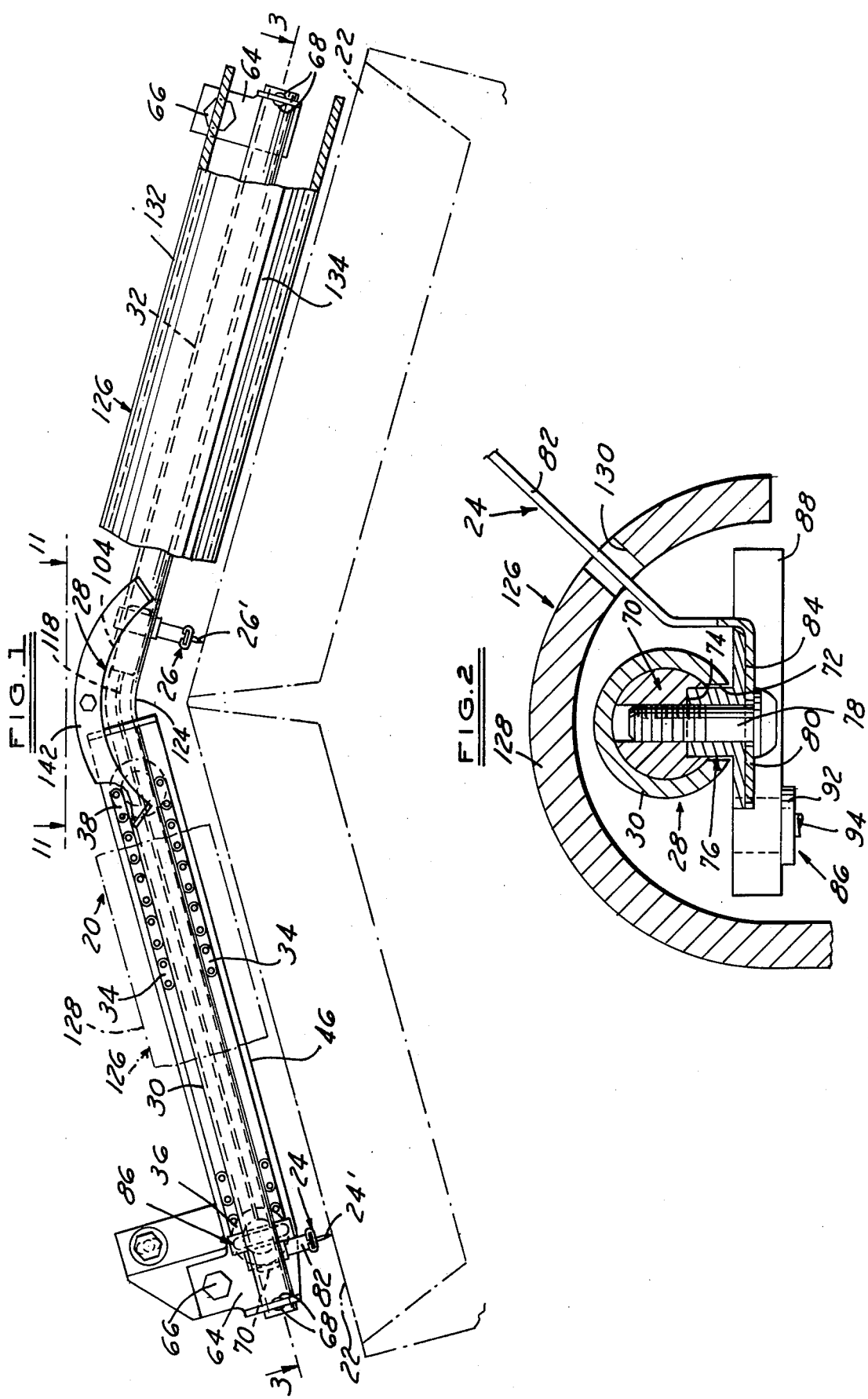

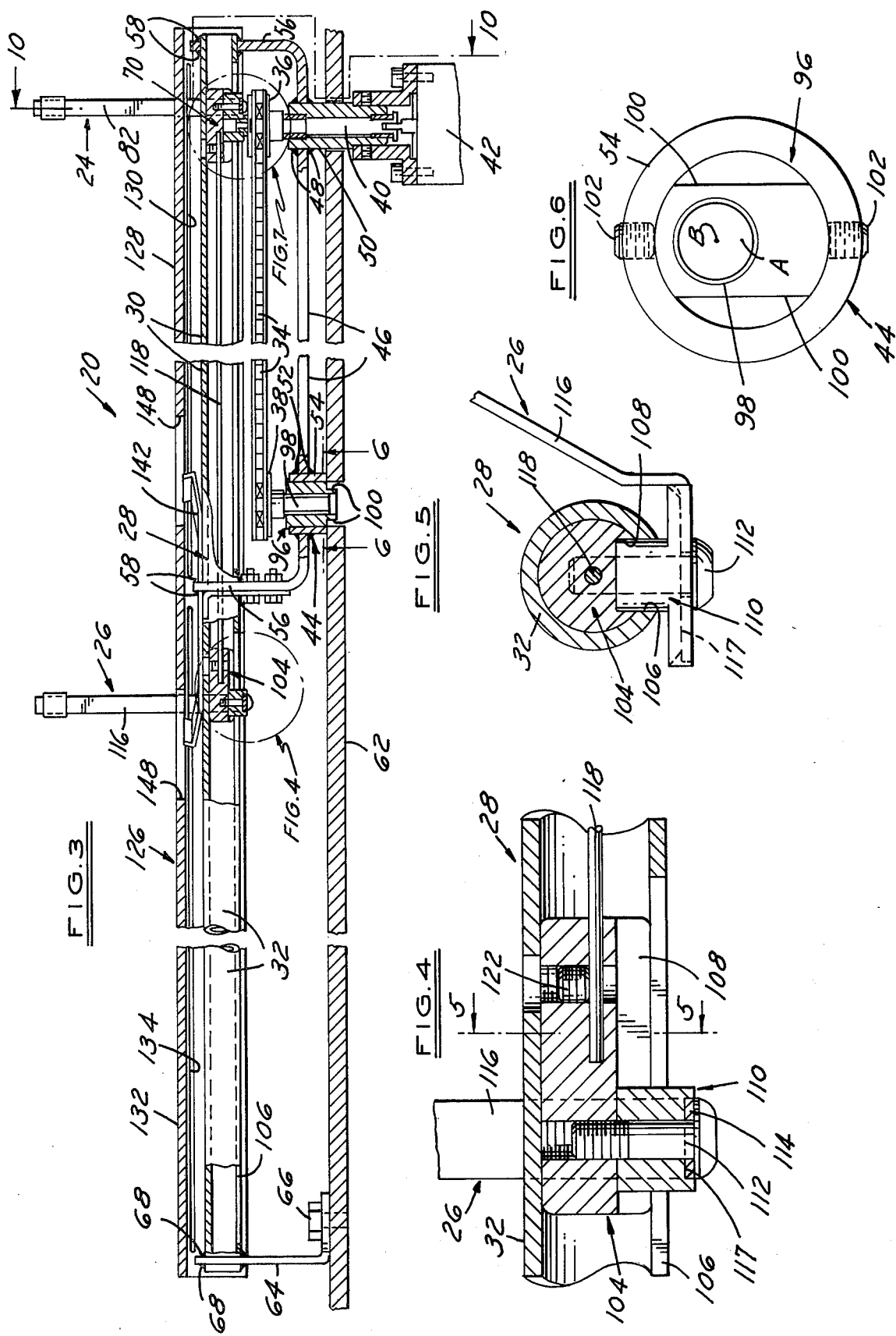

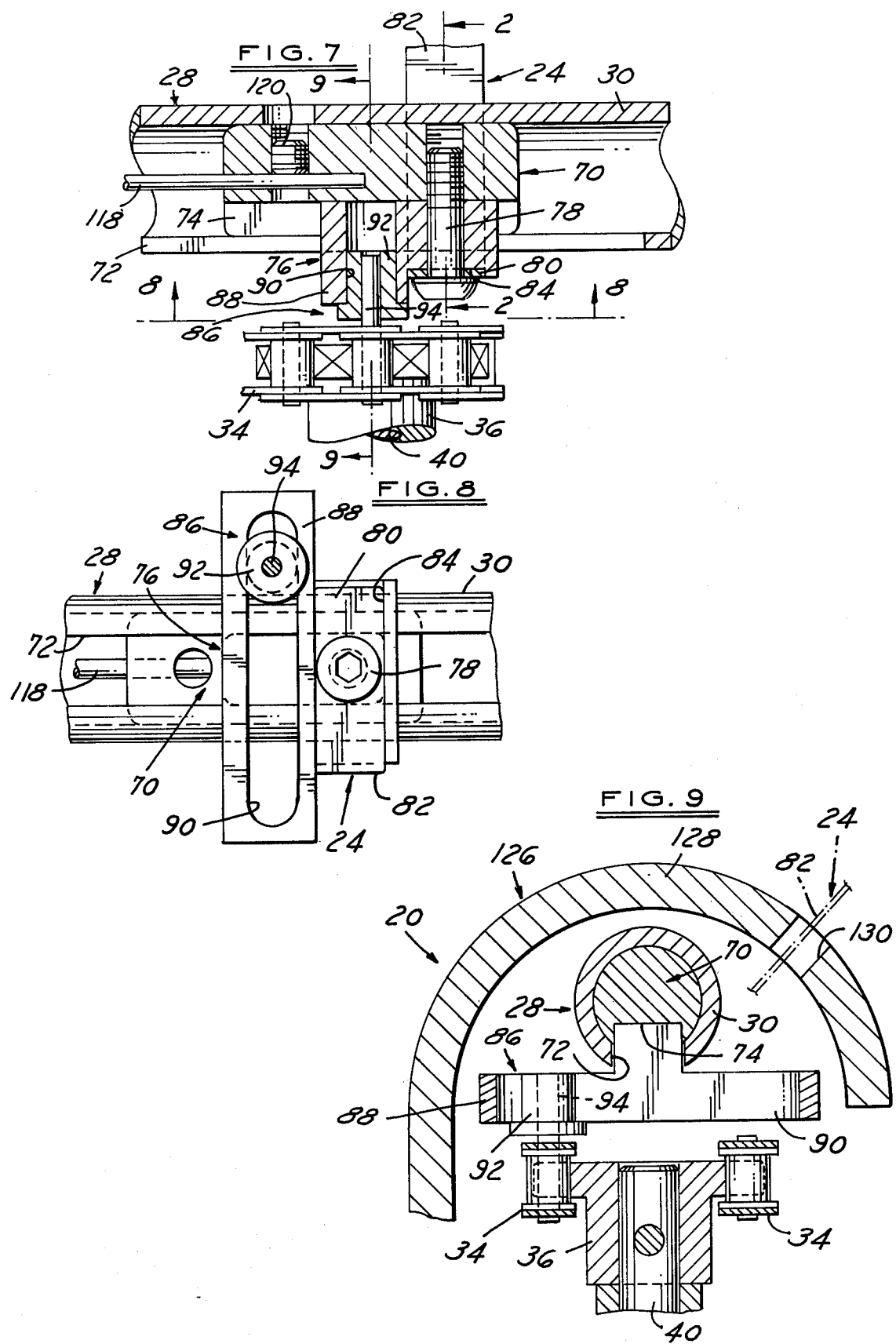

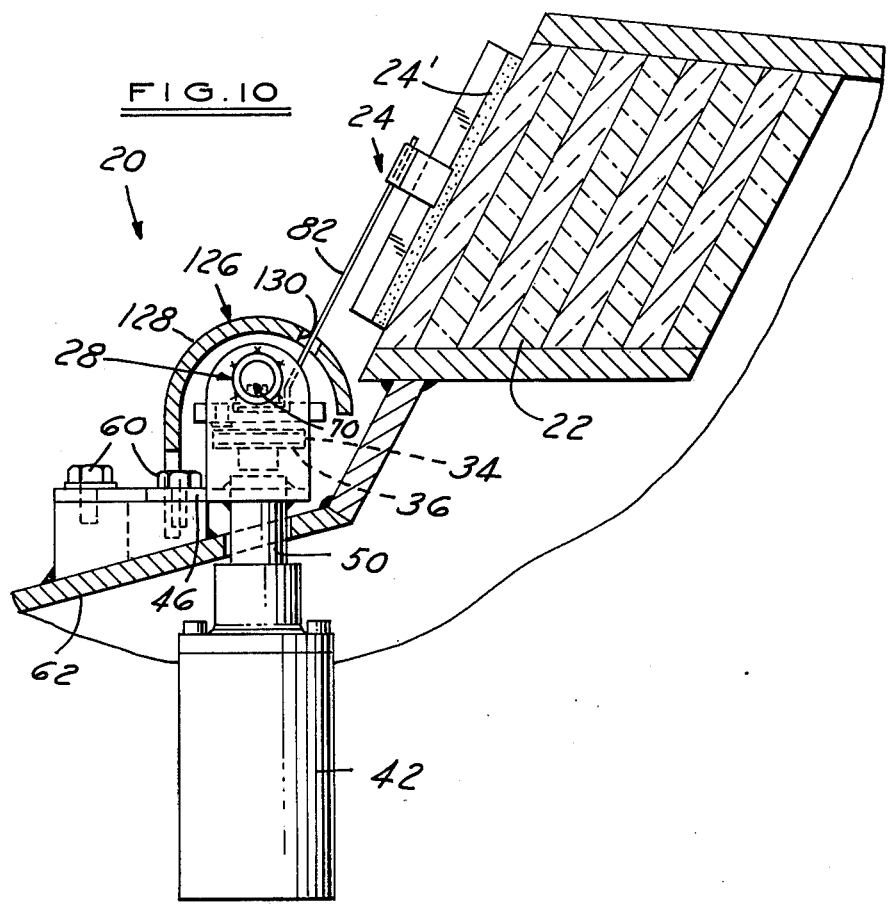
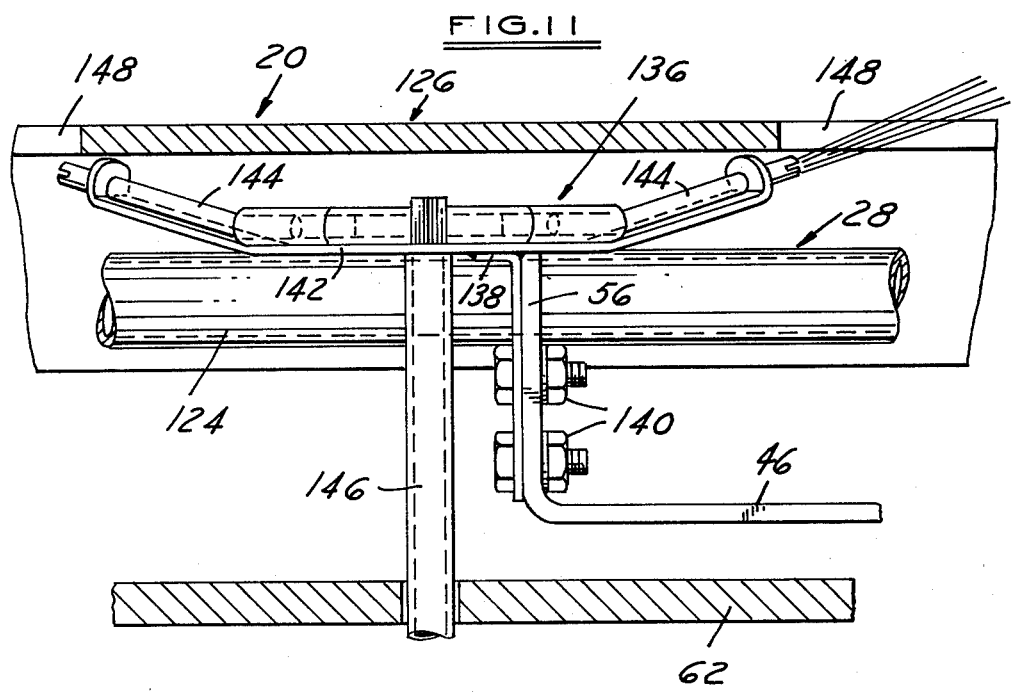

WIPER DRIVE ASSEMBLY

TECHNICAL FIELD

This invention relates to wiper drive assemblies and is particularly concerned with a wiper drive assembly that is especially adaptable for use with vision blocks of an armored car.

BACKGROUND ART

Drive assemblies for vehicle windshield wipers have previously included a continuous drive loop which is received by a pair of sheaves and is connected to a wiper to provide reciprocal driving thereof upon driven movement of the drive loop over the sheaves. Conventionally, one or more driven supports to which associated wipers are secured are received within an elongated housing or guide that also receives the drive loop and the sheaves. A slidable connection between the wiper support and the drive loop allows the reciprocal driving of the wiper upon driving of one of the sheaves that receive the drive loop in a single direction of rotation. However, such drive assemblies are somewhat bulky and unnecessarily complex due to the construction thereof with the wiper support as well as the drive loop and sheaves received within the elongated housing guide. Examples of such wiper drive assemblies are disclosed by U.S. Pat. Nos. 1,748,055; 1,827,959; 1,846,588; 1,978,886; and 2,063,055.

Other wiper drive assemblies are shown by U.S. Pat. Nos. 934,007; 1,851,791; 3,042,954; 3,505,702; 3,644,956; and 3,768,112.

Armored cars are conventionally made with bullet-proof steel panels for protecting the occupant compartment of the car. Vision blocks made from layers of tempered glass allow the occupants to view the terrain about the car. The vision blocks are bullet-proof since only the outer layers of the glass will shatter when being struck by a bullet while leaving the inner layers intact. Conventionally, a pair of vision blocks are located adjacent each other in an angled relationship that increases the angular field the car occupant can view. Screens have been used in the past to keep the vision blocks clean for viewing, but such screens can themselves become dirty during movement of the armored car.

DISCLOSURE OF THE INVENTION

An object of the present invention is to provide an improved wiper drive assembly which is particularly adaptable for use with vision blocks of an armored car.

In carrying out the above object and other objects of this invention, a preferred embodiment of the wiper drive assembly includes a hollow guide having first and second elongated portions adapted to extend alongside armored car vision blocks which are skewed in an angular relationship with respect to each other. First and second wiper supports are respectively received within the first and second guide portions for reciprocal movement along the lengths thereof in opposite directions and are adaptable to support a pair of wipers for cleaning the vision blocks. Each wiper support includes an extension that projects through a slot in the associated guide portion to provide the mounting of the wiper. The first wiper support extension includes a connection portion that extends transversely with respect to the first guide slot externally of the first guide portion. A continuous drive loop of a flexible construction is received by a pair of sheaves so as to have a pair of drive loop reaches that extend parallel to the first guide portion. A slidable connection between the connection portion of the first wiper support and the drive loop provides reciprocal driving of the first wiper support upon rotative driving of one of the sheaves in a single direction by a drive means such as an electric motor.

An elongated connector of a flexible construction extends between the first and second wiper supports and is received within the portions of the guide in a guided relationship. Upon reciprocal movement of the first wiper support by the continuous drive loop, concomitant movement of the connector moves the second wiper support along with the first wiper support in a reciprocal manner. An intermediate portion of the guide has a smoothly curved shape through which the connector extends and is preferably unitary with the first and second guide portions so as to facilitate the guiding action which is provided to the connector during the reciprocal driving movement of the wiper supports.

Most preferably, the drive loop is embodied as a continuous chain and the sheaves are embodied as a pair of sprockets that receive the chain. Similarly, the most preferred construction of the elongated connector is embodied by a wire that extends between the pair of wiper supports within the portions of the hollow guide. Threaded fasteners secure opposite ends of the wire to the first and second wiper supports. Cooperation between the continuous chain which drives the first wiper support in a reciprocal manner and the wire which drives the second wiper support in a reciprocal manner along with the first wiper support provides an efficient wiper drive assembly which is particularly adaptable for use with armored cars due to the relatively uncomplicated but nevertheless durable structure provided.

The slidable connection that drives the first wiper support preferably includes an elongated connection slot in the connection portion of the extension of this support and a connection member which is slidably received within the connection slot and secured to the continuous chain that embodies the continuous drive loop. Slidable movement of the connection member within the connection portion slot during driving of the chain provides the reciprocal movement of the first wiper support as the connection member changes its direction of movement upon passing over each chain sprocket. One of the chain sprockets is driven by the electric motor in a single direction of rotation while the other chain sprocket is supported by an adjuster that controls the tension of the drive chain. The tension adjuster preferably is embodied by an eccentric that rotatably supports the other chain sprocket and is itself secured by a pair of lock screws in order to maintain the desired chain tension.

Each of the guide portions preferably has a generally round cross section and the wiper supports likewise have round cross sections which are complementary to the cross sections of the associated guide portions. A groove in each wiper support is aligned with the associated guide portion slot and receives the extension thereof which projects out through the slot. A threaded connection secures each extension to the associated wiper support and is also adaptable to releasably secure the arm of a wiper to be mounted by the support. The extension of the first wiper support is formed unitary with the connection portion that defines the elongated connection slot for driving the first wiper support by the continuous drive chain.

A cover of the drive assembly receives the guide, the chain sprockets, and the continuous chain and has slots through which wipers secured to the wiper supports are adapted to project for wiping a pair of vision blocks on an armored car that supports the wiper drive assembly. Elongated portions of the cover like the guide portions and the vision blocks are skewed with respect to each other in the same angular relationship, defining an included angle of about 150° in the preferred construction disclosed. A washer fluid supply system of the assembly is also received within the cover adjacent the juncture between the angularly oriented portions thereof and includes a pair of nozzles for spraying washer fluid through openings of the cover onto the vision blocks.

The objects, features, and advantages of the present invention are readily apparent from the following description of the best mode for carrying out the invention when taken in connection with the accompanying drawings.

BRIEF DESCRIPTION OF DRAWINGS

FIG. 1 is a top plan view illustrating a wiper drive assembly that embodies the present invention and which is shown positioned adjacent a pair of vision blocks of an armored car to provide wiping thereof;

FIG. 2 is a sectional view through the wiper drive assembly taken along line 2—2 of FIG. 7;

FIG. 3 is an elevation view of the wiper drive assembly taken in section along line 3—3 of FIG. 1;

FIG. 4 is an enlarged view of a portion of FIG. 3 and illustrates one wiper support of the drive assembly;

FIG. 5 is a sectional view of the one wiper support taken along line 5—5 of FIG. 4;

FIG. 6 is a view taken along line 6—6 of FIG. 3 and illustrates an eccentric adjuster for a continuous drive loop chain of the assembly;

FIG. 7 is an enlarged view of another portion of FIG. 3 showing another wiper support of the assembly and a slidable connection thereof to the continuous drive loop chain;

FIG. 8 is a view of the slidable connection taken along line 8—8 of FIG. 7;

FIG. 9 is a sectional view through the assembly taken along line 9—9 of FIG. 7;

FIG. 10 is a sectional view taken along line 10—10 of FIG. 3 and illustrates the manner in which wiping is performed on a vision block of an armored car; and FIG. 11 is an elevation view taken partially in section along line 11—11 of FIG. 1 and illustrates a washer fluid supply system that cooperates with the wiper drive assembly to provide vision block cleaning.

BEST MODE FOR CARRYING OUT THE INVENTION

Referring to FIG. 1 of the drawings, a wiper drive assembly constructed according to the present invention is indicated collectively by reference numeral 20 and is shown in association with a pair of armored car vision blocks that are illustrated schematically and indicated by reference numeral 22. First and second wipers 24 and 26 are driven by the drive assembly 20 in a reciprocal manner and have blades indicated by like primed numerals for wiping the vision blocks 22. An included angle of about 150° is defined by the vision blocks in order to provide an occupant of the armored car an increased angular field for viewing the terrain about the car. A hollow guide 28 of the drive assembly has first and second elongated guide portions 30 and 32 that also define an included angle of about 150° and provide a guiding action for supports on which the wipers 24 and 26 are mounted. The manner in which the first wiper 24 is driven will initially be described followed by a description of the manner in which the second wiper 26 is driven.

As seen by reference to FIGS. 1 and 3, a continuous drive loop of a flexible construction is embodied by a continuous chain 34 that is received by a pair of sheaves which are embodied by chain sprockets 36 and 38. Reaches of the chain 34 extend between the sprockets in a parallel relationship to each other and the first guide portion 30. Chain sprocket 36 is supported and rotatively driven by an output shaft 40 of an electric motor 42. Chain sprocket 38 is rotatably supported on an adjuster 44 that controls the tension of the drive chain 34 in a manner which is hereinafter more fully described. A support bracket 46 is secured by welds 48 to a sleeve 50 through which the electric motor output shaft 40 extends and is also secured by welds 52 to a housing 54 of the tension adjuster 44. Ends 56 of bracket 46 are bent at right angles and have openings that receive the first guide portion 30 with welds 58 providing securement. Bolts 60 (FIG. 10) secure the bracket 46 to a bullet-proof plate 62 of the armored car. Another bracket 64 (FIG. 3) is also secured to the bullet-proof plate 62 by a bolt 66 and has an opening that receives the second guide portion 32 with welds 68 providing securement.

As seen by further reference to FIGS. 7, 8, and 9, the first guide portion 30 of guide 28 receives a wiper support 70 for translatory movement along its length in opposite directions. Guide portion 30 has a generally round cross section (FIG. 9) and defines an elongated slot 72 along the length of its lower extremity. Wiper support 70 has a round cross section which is complementary to the cross section of the guide portion 30 and defines a lower groove 74 that is aligned with the guide portion slot 72. An extension 76 of the wiper support 70 is received by the groove 74 thereof and extends outwardly through the guide portion slot 72. A threaded connection of the wiper support 70 includes a bolt 78 that secures the extension 76 to the wiper support and also releasably secures the lower end 80 on the wiper arm 82 of wiper 24. It will be noted in FIG. 8 that the wiper arm end 80 is received within a groove 84 of the extension 76 so as to be cooperable with the bolt 78 in positioning the wiper arm.

Extension 76 of the wiper support 70 shown in FIGS. 7, 8, and 9 also has a slidable connection 86 with the continuous drive chain 34. Connection 86 includes a connection portion 88 that is unitary with the extension 76 extending transversely with respect to the guide portion slot 72 as shown in FIG. 8 below the guide portion 30. Connection portion 88 defines an elongated connection slot 90 whose length is slightly longer than the distance between the reaches of the chain 34 extending between the chain sprockets 36 and 38 as shown in FIG. 1. Connection 86 also includes a connection member 92 which, as shown in FIGS. 7, 8, and 9, is mounted on one extended chain link pin end 94 and slidably received within the connection slot 90. Rotative driving movement of the chain sprocket 36 by the electric motor 42 (FIG. 3) in a single direction drives the chain and through the slidable connection 86 drives the wiper support 70 in a reciprocal manner. As the wiper support 70 reaches the extreme of its travel in each direction adjacent the chain sprockets 36 and 38 shown in FIG. 1, the chain connection member 92 slides from one end of the connection slot 90 to the other end thereof in order to commence movement of the wiper support in the opposite direction. Wiper support 70 thus is moved reciprocally with a length of travel equal to the distance between the semicircular portions of the chain 34 received by the sprockets 36 and 38.

The adjuster 44 which controls the tension of chain 34 is shown in FIGS. 5 and 6 and preferably includes an eccentric 96 that mounts a shaft 98 on which the chain sprocket 38 is rotatably supported. The housing 54 of the tension adjuster has an annular shape and mounts the eccentric 96 for movement about an axis A which is spaced from the axis B of the shaft 98 as shown in FIG. 6. Consequently, rotation of the eccentric 96 by a suitable wrench which engages flats 100 thereof moves the shaft 98 on which the sprocket 38 is supported toward or away from the other sprocket 36 in order to adjust the tension of the chain 34. Lock screws 102 which are threaded into the housing 54 engage the eccentric 96 to maintain the adjusted position thereof with the desired chain tension.

The second wiper 26 shown in FIG. 1 is mounted by a second wiper support 104 illustrated in FIGS. 3, 4, and 5. Wiper support 104 is received within the second elongated guide portion 32 of the guide 28 for translatory movement along the length thereof in opposite directions. Guide portion 32 has a generally round cross section as shown in FIG. 5 and defines an elongated slot 106 along the lower extremity of its length. Wiper support 104 has a round cross section, as also shown in FIG. 5, complementary to the guide portion 32 and defines a lower groove 108 that is aligned with the guide portion slot 106. An extension 110 of wiper support 106 is received within the lower groove 108 thereof and extends downwardly through the guide portion slot 106. A threaded connection of the extension 110 includes a bolt 112 that secures the extension 110 to the wiper support 104 and also releasably secures the lower end 114 and a wiper arm 116 of wiper 26. Extension 110 has a groove 117 that receives the wiper arm end 114 in order to cooperate with bolt 112 in positioning the wiper.

As seen in FIGS. 1, 3, 4, and 7, the second wiper support 104 is reciprocally driven along with the first wiper support 70 by an elongated connector which is preferably embodied by a wire 118 received within the guide 28. Wire 118 has one end secured to the reciprocally driven first wiper support 70 as shown in FIG. 7 by a threaded fastener 120 and has another end secured to the second wiper support 104 as shown in FIG. 4 by a threaded fastener 122. A smoothly curved intermediate portion 124 of guide 28 is unitary with the guide portions 30 and 32 and receives the portion of the wire 118 negotiating the juncture between the two unaligned portions of the guide receiving the wiper supports. The wire for providing the connection must have sufficient lateral flexibility to bend between the angular directions along which the two wiper supports are reciprocated but must have sufficient rigidity so as not to buckle when received within the guide 28 in the guided manner shown. Although the particular wire utilized may depend upon the application in which it is utilized, piano wire having a diameter of sixty-thousandths of an inch was used in the drive assembly shown and was found to function effectively with the guide 28 whose inner diameter is about one-half of an inch.

As seen in FIGS. 1, 3, and 10, the drive assembly 20 also includes a cover 126 that receives the guide 28 and the drive chain 34 to protect the wiper assembly during use. Cover 126 includes a first elongated portion 128 that receives the first guide portion 30 and the associated drive chain 34. Cover portion 128 includes a slot 130 through which the associated wiper arm 82 extends to support the blade 24' of the wiper in the manner shown in FIG. 10 in wiping engagement with the outer layer of tempered glass of the vision block 22. Cover 126 also has another elongated portion 132 that receives the second guide portion 32 extending parallel therewith as shown in FIGS. 1 and 3. Cover portion 132 has a slot 134 through which the wiper arm 116 of wiper 26 extends to likewise support the associated wiper blade thereof in wiping engagement with the other vision block.

Referring to FIG. 11, the drive assembly 20 also has an associated washer fluid supply system indicated collectively by reference numeral 136. The washer fluid supply system 136 includes a support bracket 138 secured to one end of bracket 46 by a pair of nut and bolt connections 140. A nozzle support member 142 is welded to the upper end of bracket 138 and supports a pair of nozzle tubes 144 that are fed by a supply tube 146 which extends upwardly through a suitable opening in the bullet-proof plate 62. Washer fluid is sprayed by nozzles at the ends of tubes 144 outwardly through a pair of openings 148 in the cover onto the pair of vision blocks 22 shown in FIG. 1 in order to provide cleaning during operation of the wiper drive assembly.

While a preferred embodiment of the wiper drive assembly has been herein described in detail, those familiar with this art will recognize various alternative designs and embodiments for practicing the present invention as defined by the following claims.

What is claimed is:

1. A wiper drive assembly comprising: an elongated guide of a hollow construction having an elongated slot extending along the length thereof; a continuous drive loop of a flexible construction; a pair of sheaves over which the drive loop is trained so as to have a pair of reaches extending therebetween in a parallel relationship to the guide; a wiper support received within the guide for translatory movement along the length thereof in opposite directions; said wiper support having an extension that projects through the slot in the guide and a connection portion that extends transversely with respect to the guide slot externally of the guide; a slidable connection between the connection portion of the wiper support and the drive loop; and means for rotatively driving one of the sheaves in a single direction to thereby drive the loop and move the wiper support in a reciprocal manner through the slidable connection.

2. An assembly as in claim 1 wherein the drive loop comprises a continuous chain and the pair of sheaves comprise sprockets that receive the chain.

3. An assembly as in claim 1 or 2 wherein the slidable connection includes an elongated slot in the connection portion of the wiper support, and the slidable connection also including a connection member secured to the drive loop and slidably received within the slot in the connection portion of the wiper support.

4. An assembly as in claim 3 further including an adjuster for adjusting the tension of the drive loop.

5. An assembly as in claim 4 wherein the adjuster includes an eccentric that rotatably supports the other sheave.

6. An assembly as in claim 5 wherein the drive means includes an electric motor that drives said one sheave.

7. An assembly as in claim 1 further including a cover that receives the guide and the drive loop, and the cover including an elongated slot through which a wiper on the wiper support can project.

8. An assembly as in claim 7 wherein the wiper support includes a threaded connection for releasably securing a wiper arm thereto.

9. A wiper drive assembly comprising: an elongated guide of a hollow construction having an elongated slot extending along the length thereof; a continuous drive chain; a pair of sprockets that receive the drive chain so as to have a pair of chain reaches extending therebetween in a parallel relationship to the guide; an adjuster for adjusting the tension of the drive chain; a wiper support received within the guide for translatory movement along the length thereof in opposite directions; said wiper support having an extension that projects through the slot in the guide and a connection portion that extends transversely with respect to the guide slot externally of the guide; a slidable connection including an elongated connection slot in the connection portion of the wiper support; said connection slot extending in a transverse direction with respect to the guide slot and the chain reaches; said slidable connection also including a connection member secured to the drive chain and slidably received within the connection slot in the connection portion of the wiper support; an electric motor for rotatively driving one of the sheaves in a single direction to thereby drive the loop and move the wiper support in a reciprocal manner through the slidable connection; a cover that receives the guide and the drive chain; the cover including an elongated slot through which a wiper on the wiper support can project; and a threaded connection for releasably securing a wiper arm of a wiper to the wiper support.

10. A wiper drive assembly comprising: a guide of a hollow construction having first and second elongated portions that are positioned in an unaligned relationship with respect to each other; first and second wiper supports respectively received within the first and second guide portions for movement along the lengths thereof in opposite directions; drive means for driving the first wiper support in a reciprocal manner along the length of the first guide portion; and an elongated connector of a flexible construction that extends between the first and second wiper supports and is received within the portions of the guide in a guided relationship so as to move the second wiper support along with the first wiper support in a reciprocal manner upon operation of the drive means.

11. A drive assembly as in claim 10 wherein the elongated connector comprises a wire having opposite ends that are respectively secured to the first and second wiper supports.

12. A drive assembly as in claim 11 wherein each wiper support includes a threaded fastener for securing an associated end of the wire.

13. A drive assembly as in claim 12 wherein each guide portion has an elongated slot extending along the length thereof, and each wiper support having an extension that projects out through the associated guide portion slot.

14. A drive assembly as in claim 13 wherein each wiper support extension includes a threaded connection for releasably securing an arm of a wiper.

15. A drive assembly as in claim 14 wherein one of the wiper support extensions also includes a slidable connection portion having an elongated connection slot that extends transversely with respect to the associated guide portion slot and is connected to the drive means.

16. A drive assembly as in claim 15 wherein each guide portion has a generally round cross section, and each wiper support also having a generally round cross section complementary to the cross section of the associated guide portion.

17. A drive assembly as in claim 16 wherein each wiper support has a groove in the generally round cross section thereof, the groove of each wiper support being aligned with the associated guide portion slot, and the extension of each wiper support being received within the groove thereof and secured thereto by the threaded connection thereof which is adapted to secure a wiper arm to the support.

18. A drive assembly as in claim 17 further including a cover that receives the guide portions, said guide portions defining an included angle of about 150°, and the cover including elongated portions that are skewed with respect to each other at the same angular relationship as the guide portions.

19. A wiper drive assembly comprising: a unitary guide of a hollow construction having first and second elongated portions that are positioned in an unaligned relationship with respect to each other; each guide portion having a round cross section and including an elongated slot along the length thereof; first and second wiper supports of round cross sections respectively received within the first and second guide portions for translatory movement along the lengths thereof in opposite directions; each wiper support having an extension that projects out through the associated guide portion slot; each extension including a threaded connection for releasably securing a wiper arm thereto as well as securing the extension to the associated wiper support; the extension of the first wiper support including a connection portion; drive means slidably connected to the connection portion of the first wiper support to provide driving thereof in a reciprocal manner along the length of the first guide portion; a wire that extends between the first and second wiper supports; said wire being received within the portions of the guide in a guided relationship so as to move the second wiper support along with the first wiper support in a reciprocal manner upon operation of the drive means; a cover that receives the guide and the drive means; and said cover having slots through which wipers secured to the wiper supports are adapted to project.

20. A wiper drive assembly comprising: a guide of a hollow construction having first and second elongated portions that are positioned in an unaligned relationship with respect to each other; each guide having an elongated slot along the length thereof; first and second wiper supports respectively received within the first and second guide portions for translatory movement along the lengths thereof in opposite directions; each wiper support having an extension that projects outwardly through the associated guide portion slot; the first wiper support having a connection portion that extends transversely with respect to the associated guide portion slot externally of the guide portion thereof; a continuous drive loop of a flexible construction; a pair of sheaves over which the drive loop is trained so as to have a pair of reaches extending therebetween in a parallel relationship to the first guide portion; a slidable connection between the connection portion of the first wiper support and the drive loop; means for rotatively driving one of the sheaves in a single direction to thereby drive the loop and move the first wiper support in a reciprocal manner through the slidable connection; and an elongated connector of a flexible construction that extends between the first and second wiper supports and which is received within the portions of the guide in a guided relationship so as to move the second wiper support along with the first wiper support in a reciprocal manner upon operation of the drive means.

21. A wiper drive assembly for armored car vision blocks, the assembly comprising: a guide of a hollow construction having unitary first and second elongated portions that are positioned in an unaligned relationship with respect to each other; said guide having a smoothly curved intermediate portion that connects the first and second elongated guide portions; each guide portion having an elongated slot along the length thereof; first and second wiper supports respectively received within the first and second guide portions for translatory movement along the lengths thereof in opposite directions; each wiper support having an extension that projects outwardly through the associated guide portion slot; the first wiper support having a connection portion that extends transversely with respect to the associated guide slot externally of the guide portion thereof; a continuous drive chain; a pair of sprockets that receive the drive chain so as to have a pair of reaches extending therebetween in a parallel relationship to the first guide portion; a slidable connection between the connection portion of the first wiper support and the drive chain; means for rotatively driving one of the sprockets in a single direction to thereby drive the chain and move the first wiper support in a reciprocal manner through the slidable connection; a wire that extends between the first and second wiper supports; said wire being received within the portions of the guide in a guided relationship so as to move the second wiper support along with the first wiper support in a reciprocal manner upon operation of the drive means; and a cover that receives the guide and the drive chain and which includes slots through which wipers secured to the wiper supports are adapted to project.

22. An assembly as in claim 21 wherein each wiper support includes a threaded connection for securing the extension thereof and a wiper arm to the support.

23. An assembly as in claim 22 wherein each wiper support includes a threaded fastener for securing the wire.

24. An assembly as in claim 21 wherein the slidable connection includes a connection slot in the connection portion of the first wiper support and also includes a connection member which is secured to the drive chain and slidably received within the connection slot in the connection portion of the first wiper support.

25. An assembly as in claim 21 wherein the drive means includes an electric motor that rotatively drives said one chain sprocket.

26. An assembly as in claims 21 or 25 which includes a chain tensioner that comprises an eccentric for rotatably supporting the other chain sprocket.

27. An assembly as in claim 26 wherein the eccentric includes a pair of threaded lock screws.

28. An assembly as in claim 21 further including a washer fluid supply system having a pair of nozzles respectively associated with each guide portion.

29. An assembly as in claim 28 wherein the washer fluid supply system is received within the cover which includes openings through which the nozzles spray washer fluid.

30. In combination with an armored car including a pair of vision blocks that are angled with respect to each other, a wiper drive assembly comprising: a guide of a hollow construction having unitary first and second elongated portions that are positioned in an unaligned relationship with respect to each other; said guide having a smoothly curved intermediate portion that connects the first and second elongated portions; each guide portion having an elongated slot along the length thereof; first and second wiper supports respectively received within the first and second guide portions for translatory movement along the lengths thereof in opposite directions; each wiper support having an extension that projects outwardly through the associated guide portion slot; each wiper support having a threaded connection for securing a wiper arm and the associated extension thereof to the support; the extension of the first wiper support having a connection portion unitary therewith extending transversely with respect to the associated guide slot externally of the guide portion thereof; a continuous drive chain; a pair of sprockets that receive the drive chain so as to have a pair of chain reaches extending therebetween in a parallel relationship to the first guide portion; a slidable connection including an elongated connection slot in the connection portion of the first wiper support; said connection slot extending in a transverse direction with respect to the associated guide portion slot and the chain reaches; said slidable connection also including a connection member secured to the drive chain and slidably received within the connection slot in the connection portion of the first wiper support; an electric motor for rotatively driving one of the sprockets in a single direction to thereby drive the chain and move the first wiper support in a reciprocal manner through the slidable connection; a chain tensioner including an eccentric that rotatably supports the other chain sprocket so as to control the tension of the chain; a wire that extends between the first and second wiper supports; said wire being received within the portions of the guide in a guided relationship so as to move the second wiper support along with the first wiper support in a reciprocal manner during operation of the electric motor; and a cover that receives the guide and the drive chain and which includes slots through which wipers secured to the wiper supports are adapted to project.

* * * * *